US011948761B2

United States Patent
(12) United States Patent
Schmid et al.

(10) Patent No.: US 11,948,761 B2
(45) Date of Patent: Apr. 2, 2024

(54) METHOD FOR CARRYING OUT A SWITCHOVER OF AT LEAST TWO SWITCHING MEANS FOR EQUIPMENT, AND DRIVE SYSTEM FOR AT LEAST TWO SWITCHING MEANS IN EQUIPMENT

(71) Applicant: Maschinenfabrik Reinhausen GmbH, Regensburg (DE)

(72) Inventors: Sebastian Schmid, Sinzing (DE); Eduard Zerr, Regensburg (DE); Klaus Ixmeier, Thumhausen (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 140 days.

(21) Appl. No.: 17/609,797

(22) PCT Filed: Apr. 23, 2020

(86) PCT No.: PCT/EP2020/061289
§ 371 (c)(1),
(2) Date: Nov. 9, 2021

(87) PCT Pub. No.: WO2020/229127
PCT Pub. Date: Nov. 19, 2020

(65) Prior Publication Data

US 2022/0277906 A1 Sep. 1, 2022

(30) Foreign Application Priority Data

May 15, 2019 (DE) ..................... 10 2019 112 721.1

(51) Int. Cl.

| | |
|---|---|
| ***H01H 3/26*** | (2006.01) |
| ***H01H 9/00*** | (2006.01) |
| *H01F 29/04* | (2006.01) |

(52) U.S. Cl.
CPC ............ *H01H 3/26* (2013.01); *H01H 9/0011* (2013.01); *H01F 29/04* (2013.01); *H01H 2003/266* (2013.01); *H01H 2009/0061* (2013.01)

(58) Field of Classification Search
CPC .. H01H 3/26; H01H 9/0011; H01H 2003/266; H01H 2009/0061; H01H 9/0027; H01F 29/04

(Continued)

(56) References Cited

U.S. PATENT DOCUMENTS

| | | | |
|---|---|---|---|
| 4,384,247 | A | 5/1983 | Stewart |
| 9,679,710 | B1 | 6/2017 | Schaar |

(Continued)

FOREIGN PATENT DOCUMENTS

| | | | |
|---|---|---|---|
| DE | 10315204 | A1 | 10/2004 |
| DE | 202010012811 | U1 | 12/2011 |

(Continued)

*Primary Examiner* — Rexford N Barnie
*Assistant Examiner* — Xuan Ly
(74) *Attorney, Agent, or Firm* — LEYDIG VOIT & MAYER LTD.

(57) ABSTRACT

A method carries out a switchover of a first switch or at least one second switch for equipment. The method includes receiving, by a controller, a switching signal; selecting, by the controller, the first switch or at least the second switch for switchover on the basis of the switching signal; querying, by the controller, at least one parameter of the first switch or the at least second switch; checking a locking condition on the basis of the at least one queried parameter for the first switch or a locking condition for the at least second switch; and carrying out the switchover by the selected first switch or the at least second switch based upon the corresponding locking condition being met.

16 Claims, 5 Drawing Sheets

(58) Field of Classification Search
USPC .......................................................... 307/113
See application file for complete search history.

(56) References Cited

U.S. PATENT DOCUMENTS

| | | | | |
|---|---|---|---|---|
| 2009/0256504 | A1* | 10/2009 | Naya | H02P 5/74 318/400.03 |
| 2015/0061806 | A1* | 3/2015 | Teising | H01H 33/6661 336/150 |

FOREIGN PATENT DOCUMENTS

| | | | |
|---|---|---|---|
| DE | 102014110732 | A1 | 2/2016 |
| EP | 0178276 | * | 4/1986 |
| WO | WO 2008024048 | A1 | 2/2008 |
| WO | WO 2012135209 | A1 | 10/2012 |

* cited by examiner

METHOD FOR CARRYING OUT A SWITCHOVER OF AT LEAST TWO SWITCHING MEANS FOR EQUIPMENT, AND DRIVE SYSTEM FOR AT LEAST TWO SWITCHING MEANS IN EQUIPMENT

CROSS REFERENCE TO RELATED APPLICATIONS

This application is a U.S. National Phase application under 35 U.S.C. § 371 of International Application No. PCT/EP2020/061289, filed on Apr. 23, 2020, and claims benefit to German Patent Application No. DE 10 2019 112 721.1, filed on May 15, 2019. The International Application was published in German on Nov. 19, 2020 as WO 2020/229127 A1 under PCT Article 21(2).

FIELD

The invention relates to a method for carrying out a switchover of at least two switching means in equipment. The invention further relates to a drive system for at least two switching means for equipment.

BACKGROUND

German laid-open specification DE 10 2014 110 732 A1 discloses an on-load tap-changer with a motor-drive unit for switching over between winding taps of a tap-changing transformer. A drive shaft is driven by means of the motor-drive unit. The rotational movement of the motor-drive unit is provided via two switchable coupling devices of a first drive shaft, which is associated with the selector, and a second drive shaft, which is associated with the diverter switch. The selector and the diverter switch can be designed to be switchable in relation to one another independently of the initial rotational movement of the motor-drive unit.

Voltage regulation in energy transmission and energy distribution networks requires different types of switches to be installed in transformers. On-load tap-changers which consist of a diverter switch and a selector and are operated by a common drive are usually installed in transformers. Both the operation and the design of the diverter switch are necessarily related to the selector. Pure adjustment of the operation of the selector or the diverter switch is not possible.

SUMMARY

In an embodiment, the present invention provides a method for carrying out a switchover of a first switch or at least one second switch for equipment. The method includes receiving, by a controller, a switching signal; selecting, by the controller, the first switch or at least the second switch for switchover on the basis of the switching signal; querying, by the controller, at least one parameter of the first switch or the at least second switch; checking a locking condition on the basis of the at least one queried parameter for the first switch or a locking condition for the at least second switch; and carrying out the switchover by the selected first switch or the at least second switch based upon the corresponding locking condition being met.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
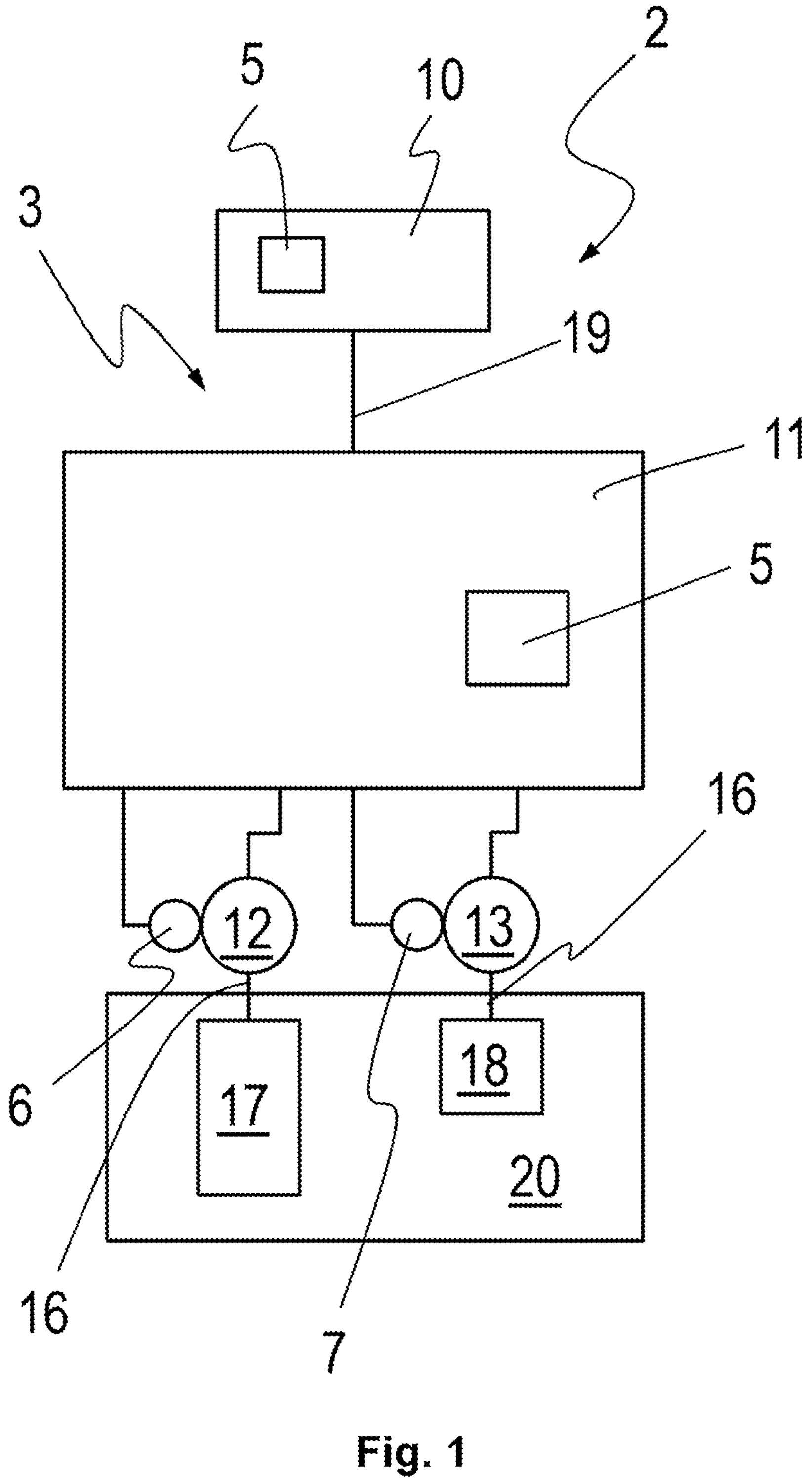
FIG. 1 shows one possible embodiment of the drive system for at least one switching means in equipment.

Embodiments of the present invention provide a method for carrying out a switchover of switching means for equipment, by way of which method the security and reliability of the switching means and the equipment are increased.

Further embodiments of the invention provide a drive system for at least two switching means for equipment, which drive system increases the security and reliability of the switching means and the equipment during the switchover process.

Exemplary embodiments of the method according to the invention are distinguished in that a switchover of a first switching means or at least one second switching means is carried out in equipment. To this end, a control unit receives a switching signal. The control unit is connected in a communicating manner to a power section which is connected to the motors for driving the switching means. The first switching means is selected for switchover by means of the control unit. At least one parameter of a first switching means or an at least second switching means is queried by the control unit. A locking condition is checked on the basis of the at least one queried parameter for the selected first switching means or for the at least second switching means. The switchover is carried out by means of the selected first switching means or the selected second switching means if the corresponding locking condition is met.

In exemplary embodiments, a power section is actuated by the control unit for the purpose of carrying out the switchover. In this way, the selected first switching means or the selected at least second switching means can be operated. The first switching means is operated via a drive shafts coupled to the first motor, depending on the switchover being carried out. The at least second switching means is operated via a respective drive shaft of a second motor. The selected first switching means and the selected at least second switching means can further be operated.

Exemplary embodiments of the method according to the invention are based, among other things, on the idea that equipment, which is a transformer for example, comprises at least one on-load tap-changer which is divided into its individual switching means or switching means groups. These individual switching means can be driven separately and individually by a dedicated motor. Before one of the switching means in the equipment is operated or switched and a switchover is carried out, a locking condition is checked. At least one parameter is queried for this check. If the locking condition is met by the queried parameter, the switchover is performed.

The at least one parameter of the first switching means and the at least second switching means can be ascertained, for example, using a feedback system. Therefore, one feedback system is associated with the first switching means and a respective further feedback system is associated with the at least second switching means.

In equipment, in particular a transformer, with two switching means, in particular a diverter switch and a selector, a control unit can check which location the selector is in, for example. The parameter for the locking condition to be checked is therefore the location of the selector, which location is ascertained by means of the feedback system of the selector.

The respective at least one parameter for the switchover of the switching means can be ascertained using each feedback system which is associated with each of the switching means present. The parameter ascertained using the feedback system is a position or location of the respective switching means. The parameter ascertained using the feedback system can also indicate whether the switching means required for the selected or determined switchover is presently being operated. If this is the case, the operation of the corresponding switching means cannot be carried out. Furthermore, the parameter can be a movement state which reveals whether the switching means is presently being operated.

The feedback system can be configured in various ways. The feedback system can be an encoder, a multi-turn rotary encoder, a single-turn rotary encoder, a resolver, a switch, a micro-switch, a sensor, a contact etc. It is self-evident to a person skilled in the art that this list of possible configurations for the feedback system is not exhaustive.

The parameters to be queried can be determined in any desired manner or can be of any desired type. The parameters can be feedback systems on the motors of the respective switching means, simple safety switches for the equipment or even customer-specific release buttons. Furthermore, the feedback system could be part of the control device which counts the operations or stops a time for a switchover and makes available therefrom the one parameter, which is to be queried, for a locking condition. Similarly, a parameter can also be obtained from a temperature sensor which is associated, for example, with each of the switching means. Similarly, safety switches, which ascertain the locking of the control cabinets associated with the equipment, can contribute to a parameter. If, for example, a safety switch was to indicate an open control cabinet, the switchover must not be executed. It is likewise self-evident to a person skilled in the art that the list of possible parameters that contribute to ascertaining the locking condition is not exhaustive.

In exemplary embodiments, the feedback system serves to determine the parameter which is necessary for checking a locking condition. The parameter is dependent on the feedback system. Depending on the configuration, the parameter is a value, a value range, a simple signal etc.

According to one possible embodiment of the invention, switching means can be combined to form a switching means group.

According to one possible embodiment of the invention, the queried parameters of the first switching means and the at least second switching means can be evaluated and combined in the control unit. Using the result of the evaluation and combination, the control unit can actuate the first switching means or the first switching means and the at least second switching means as needed.

According to one possible embodiment of the invention, a plurality of individual items of equipment can be provided. A power section is associated with each of the plurality of items of equipment, it being possible for each of said power sections to be actuated by a common control unit. The first switching means for the plurality of items of equipment are combined to form a first switching means group. The at least second switching means for the plurality of items of equipment are combined at least to form a second switching means group.

Exemplary embodiments of the present invention disclose a drive system for at least two switching means for equipment. The drive system comprises a first switching means which is connected to a first motor via a drive shaft. The drive system further comprises at least one second switching means which is connected to at least one second motor via a drive shaft. In each case, one feedback system is associated with the first motor and each at least second motor in order to ascertain at least one parameter of the switching means. A control unit which is connected in a communicating manner to a power section in order to operate the first switching means using the first motor and to operate the at least second switching means using the at least second motor ascertains which of the at least one determined parameters meets the locking conditions.

According to one possible embodiment of the invention, the at least second switching means comprise a second switching means, which is connected to a second motor, and a third switching means, which is connected to a third motor.

One advantage of various embodiments is that a dedicated motor is associated with each of the switching means and that, as a result, secure and reliable driving of the switching means is possible, in contrast with the prior art. Driving of all switching means using one motor, which is coupled to the switching means via a rod and couplings, can be dispensed with. As a result, the possibility of digital supervision of the drive system for the equipment is also achieved.

According to one possible embodiment, the drive system can be associated with a plurality of items of equipment. A power section is associated with each item of equipment. The power sections are connected in a communicating manner to the control unit. The first switching means for the plurality of items of equipment are combined to form a first switching means group. The at least one second switching means for the plurality of items of equipment are combined to form at least one second switching means group. A power section can be associated with each motor. However, one power section may also drive all the motors.

According to one possible embodiment of the invention, the at least one second switching means can consist of a second switching means and a third switching means. In this case, the second switching means are combined to form a second switching means group and the third switching means are combined to form a third switching means group.

According to one possible further embodiment of the invention, the equipment can comprise the first switching means and a plurality of second switching means. Each of the further second switching means is respectively connected to the second motor via the drive shaft. The second switching means are combined to form a second switching means group.

The control unit and/or the power section can each be provided with a memory. Specific switching positions or locations of the switching means, which are associated for example with a value for the position of the drive shaft, can be stored in the memory.

One possible embodiment of the drive system of the present invention can comprise a first motor, a second motor and a third motor. The motors are driven, for example, via a transmission and a drive shaft. The control device of the drive system comprises a power section which comprises, for example, a converter for the open-loop- or closed-loop-controlled supply of power to the motors. The control unit serves to actuate the power section. The control unit is connected to the power section via a bus, for example. The drive system has a plurality of feedback systems which are functionally associated with the drive shaft or the respective motors. Each of the feedback systems can be an encoder system. Similarly, the encoder system can be part of the feedback systems. The feedback systems or the encoder systems are connected to the power section.

According to one possible embodiment, the equipment can be a local grid transformer, transmission transformer or a distribution transformer. The switching means can be diverter switches, selectors, change-over selectors, reversing change-over selectors or double reversing change-over selectors. Parameters for a locking condition can be positions, location, movement state of diverter switches, selectors, change-over selectors, reversing change-over selectors or double reversing change-over selectors. A parameter can be configured as a value or a value range. A parameter can be queried by a control unit or transmitted to said control unit. A plurality of parameters can be combined to form one parameter.

The first switching means can be designed as a single-phase or polyphase diverter switch. The second switching means can be designed as a selector, change-over selector, reversing change-over selector or double reversing change-over selector, in particular of single-phase or polyphase design.

The invention and its advantages will now be explained in more detail using exemplary embodiments with reference to the appended drawings, without in so doing limiting the invention to the exemplary embodiment shown. The relative sizes of elements in the figures do not always correspond to the real relative sizes of elements since some forms are simplified and other forms are increased in size in comparison to other elements for improved illustration. Identical reference symbols may be used for elements of the invention which are the same or have the same effect.

FIG. 1 shows equipment 20 for energy transmission, which equipment is, in particular, a transformer. The equipment 20 comprises a first switching means 17 and a second switching means 18. A first motor 12 is connected to the first switching means 17 via a drive shaft 16. A second motor 13 is connected to the second switching means 18 via a drive shaft 16. Although the following description is limited to transformers as equipment 20 and to diverter switches or selectors as switching means 17 or 18, this should not be interpreted as limiting the invention.

In the case of the exemplary embodiment described in FIG. 1, the first switching means 17 is designed as a diverter switch. The second switching means 18 is designed as a selector. The diverter switch (first switching means 17) is operated by means of the first motor 12. The motor 12 has a drive shaft 16 which is connected to the diverter switch. Furthermore, the motor 12 has a first feedback system 6 by way of which the position of the first switching means 17 (diverter switch) can be determined. The selector (second switching means 18) is operated via a second motor 13. This second motor 13 is also connected to the selector via a drive shaft 16. A second dedicated feedback system 7 of the second motor 13 allows the position or tap position of the selector to be determined.

A control device 2 according to the invention comprises a control unit 10 which are connected to the first motor 12 and to the second motor 13 and therefore also to the first feedback system 6 and to the second feedback system 7 of the first and second switching means 17 and 18 via a power section 11. The control unit 10 receives the signals for operating the first and second switching means 17 and 18, that is to say the diverter switch and the selector. Furthermore, different values for the respective feedback systems 6 and 7 are evaluated and combined in the control unit 10. The control unit 10, the first motor 12 and the second motor 13, the feedback systems 6 and 7 and the power section 11 form a drive system 3 for the first switching means 16 or the second switching means 17 of the equipment 20.

The control device 2 receives switching signals during operation. If, for example, the voltage in the power grid drops, said voltage has to be adjusted, for example by operating the diverter switch or the diverter switch and the selector. Owing to the use of a selector with corresponding interconnection of the windings of the transformer, the regulating range of a transformer is extended. After the signal that the voltage has to be changed is received, it is initially determined whether only the diverter switch has to be operated or the diverter switch and the selector have to be operated in succession. After it has been determined that only the diverter switch has to be operated, the locking condition or the locking conditions, which were defined between the selector and the diverter switch, is/are checked/queried. For example, a diverter switch must not be operated if the selector is presently being operated. The checking is performed in such a way that the second feedback system 7 of the second motor 13 of the second switching means 18 (selector) of the control unit 10 reports the current status or transmits parameters. In this case, the location or position of the second switching means 18 (selector) is determined and transmitted via the second feedback system 7. Furthermore, the second feedback system 7 reports whether the second switching means 18 (selector) is currently being operated. If the ascertained parameters meet the locking conditions, the diverter switch is operated. If the locking conditions have not been met, the diverter switch is not operated. As an alternative, switching or operation of the diverter switch can be delayed until the locking conditions are met, that is to say the selector is in a specific location or is no longer moving. Furthermore, operation can be aborted and/or a fault signal can be generated.

The control device 2 comprises a control unit 10 with a memory 5 and at least one power section 11 with a memory 5. For example, an association of tap positions of the first switching means 17 (diverter switch) and the second switching means 18 (selector) can be stored in the memory 5. Similarly, the values for the positions of the individual drive shafts 16 can be stored in the memory 5.

Figure 2:
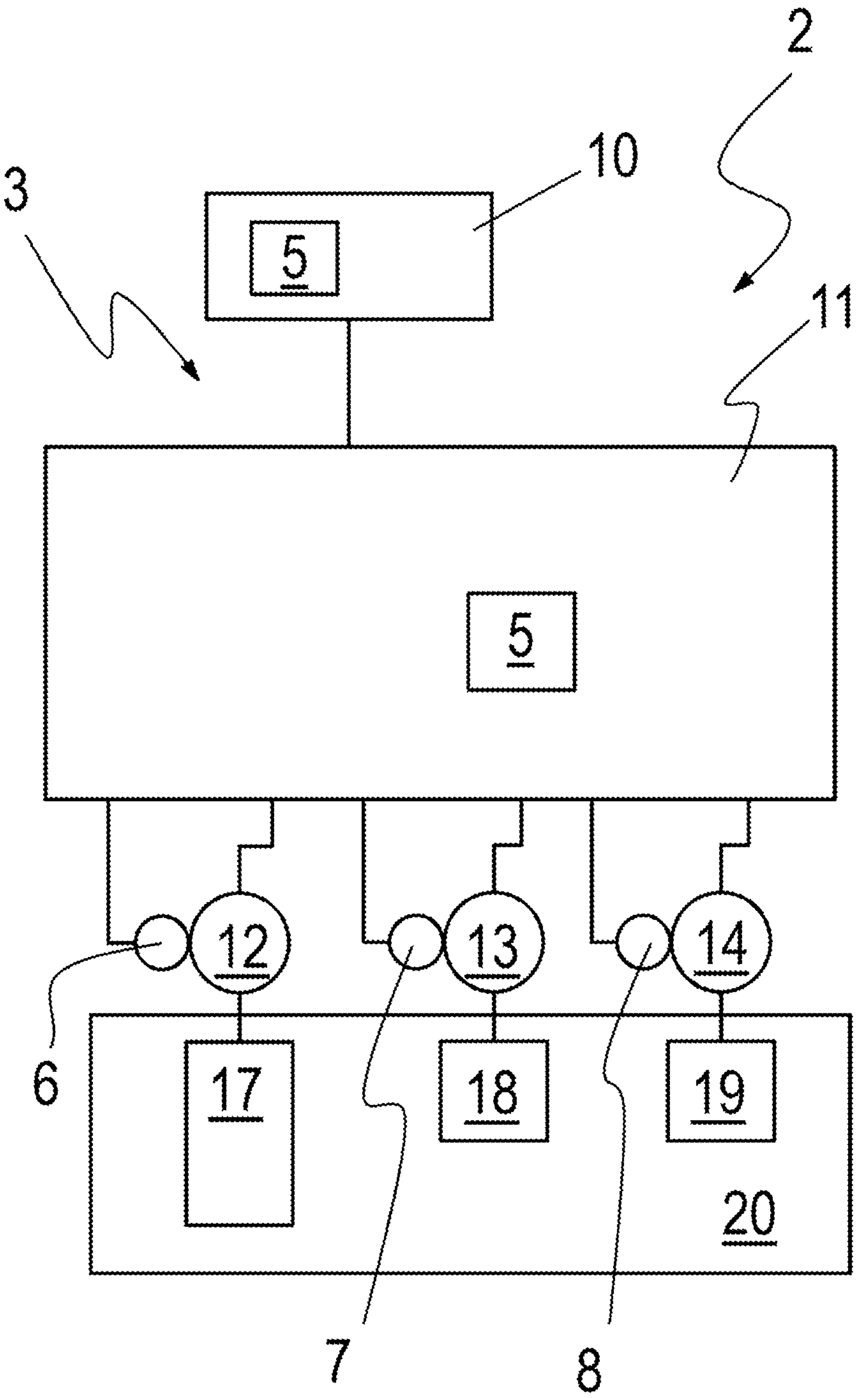
FIG. 2 shows a further embodiment of the drive system for at least one switching means in equipment.

FIG. 2 shows a further embodiment of the described drive system 3 for at least three switching means 17, 18 and 19 for equipment 20. Three switching means 17, 18 and 19 are provided in the case of this embodiment. The first switching means 17 is a diverter switch. The second switching means 18 is a selector. The third switching means 19 is a change-over selector. Each of the three switching means 17, 18, 19 is operated by a respective dedicated motor 12, 13 and 14. A respective feedback system 6, 7, 8 is associated with each of the three switching means 17, 18, 19. Different locking conditions can also be checked in the control unit 10 here. The parameters of the feedback systems 6, 7, 8 are queried for this purpose. For example, in the case of the embodiment described here, operation of the change-over selector (third switching means 19) is possible only if the selector (second switching means 18) and the diverter switch (first switching means 17) are in a specific location and are not being operated. The change-over selector (third switching means 19) may be operated, for example, only if the on-load tap-changer (first switching means 17) and the selector (second switching means 18) are substantially only still connected to the main winding of the transformer and the winding (coarse tap connection or tap winding), the polarity of which is intended to be reversed by the change-over selector (third switching means 19), is not connected up.

Figure 3:
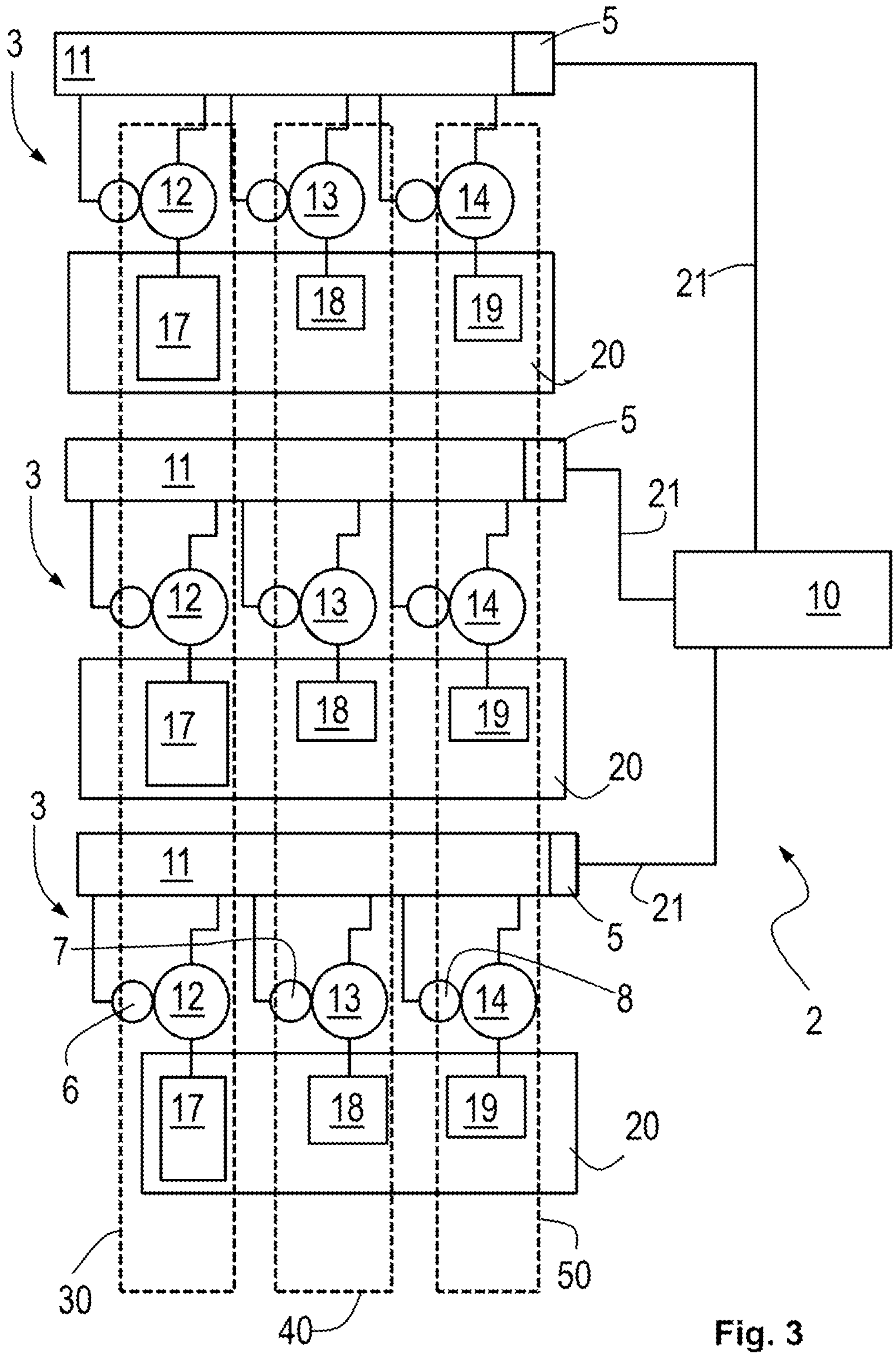
FIG. 3 shows a further exemplary embodiment of the drive system according to the invention for at least one switching means in equipment, wherein a plurality of items of equipment are provided.

FIG. 3 shows a further possible embodiment of the drive system 3 according to the invention, as described in FIG. 3, in the case of three items of equipment 20. Three items of equipment 20 can be, in particular, three transformers, the taps of which are connected up with the three switching means 17, 18 and 19 in a manner coordinated by means of the common control unit 10. The three switching means 17, 18 and 19, which are associated with each of the transformers (equipment 20), correspond in terms of their function to the three switching means 17, 18 and 19 described in FIG. 2. After a switching signal is received, a check is first made in respect of which of the switching means 17, 18 or 19 has to be operated. Three switching means groups 30, 40 and 50 can be formed for this purpose. For example, the first switching means group 30 consists of the respectively first switching means 17, specifically the diverter switches, in the respective transformers (equipment 20). A second switching means group 40 is made up of the respectively second switching means 18, specifically the selectors. A third switching means group 50 is made up of the respectively third switching means 19, specifically the change-over selectors 50. Before operation, a check is made in respect of whether the determined switching means group 30, 40 or 50 meets the locking conditions. For example, a check is made here in respect of which location each individual selector (switching means 18) of the three items of equipment 20 is in and whether one of these is moving. The locking conditions are checked on the basis of the parameters of the respective feedback systems 6, 7 and 8 which are associated with the respective switching means 17, 18 and 19 in each of the items of equipment 20. The power section 11, which is associated with each drive system 3 of each item of equipment 20, is connected to a central and single control unit 10 using a bus 21. The operation of the respective switching means 17, 18 and 19 is coordinated and controlled for each of the three items of equipment 20 by means of the central control unit 10. As already described in FIG. 2, the power section 11 accesses motors 12, 13 or 14 associated with the respective switching means 17, 18 and 19.

Figure 4:
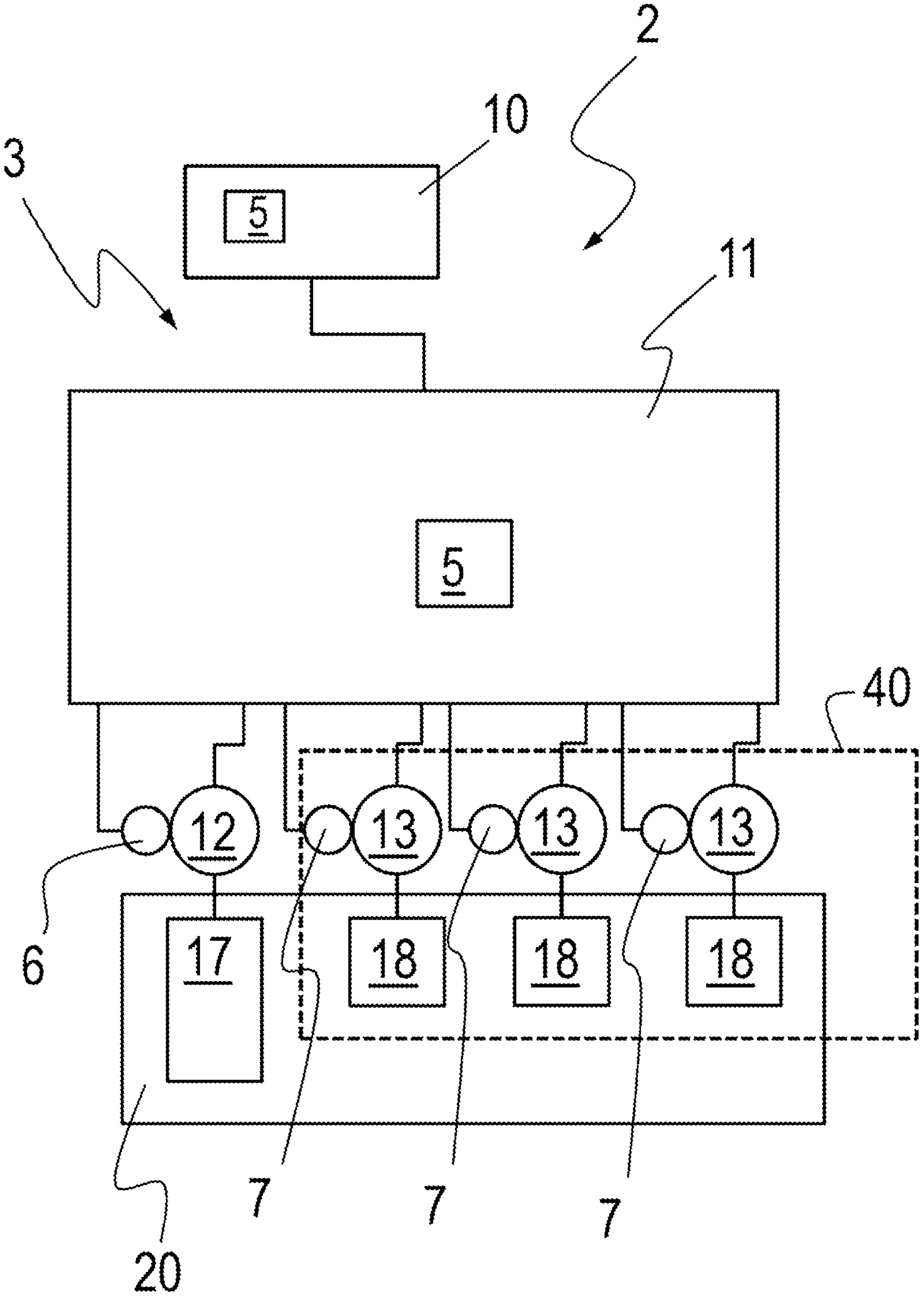
FIG. 4 shows a further exemplary embodiment of the drive system according to the invention for at least one switching means in equipment.

FIG. 4 shows a further possible embodiment of the described drive system 3. In this case, the first switching means 17 is a diverter switch and the further three second switching means 18 are three selectors of single-phase design. The first switching means 17 is operated by the first motor 12, which is associated with it. The first feedback system 6 is associated with the first switching means 17. The three second switching means 18 are operated by a respective dedicated second motor 13 and each have a second feedback system 7. As an alternative, all three selectors can be operated by a common second motor 7. In this case too, different locking conditions can be checked in the control unit 10 by way of the parameters of the first and the second feedback systems 6 and 7 being queried. The diverter switch (first switching means 12) is of three-phase design here. The selectors (second switching means 18) can be combined to form a switching means group 40.

Figure 5:
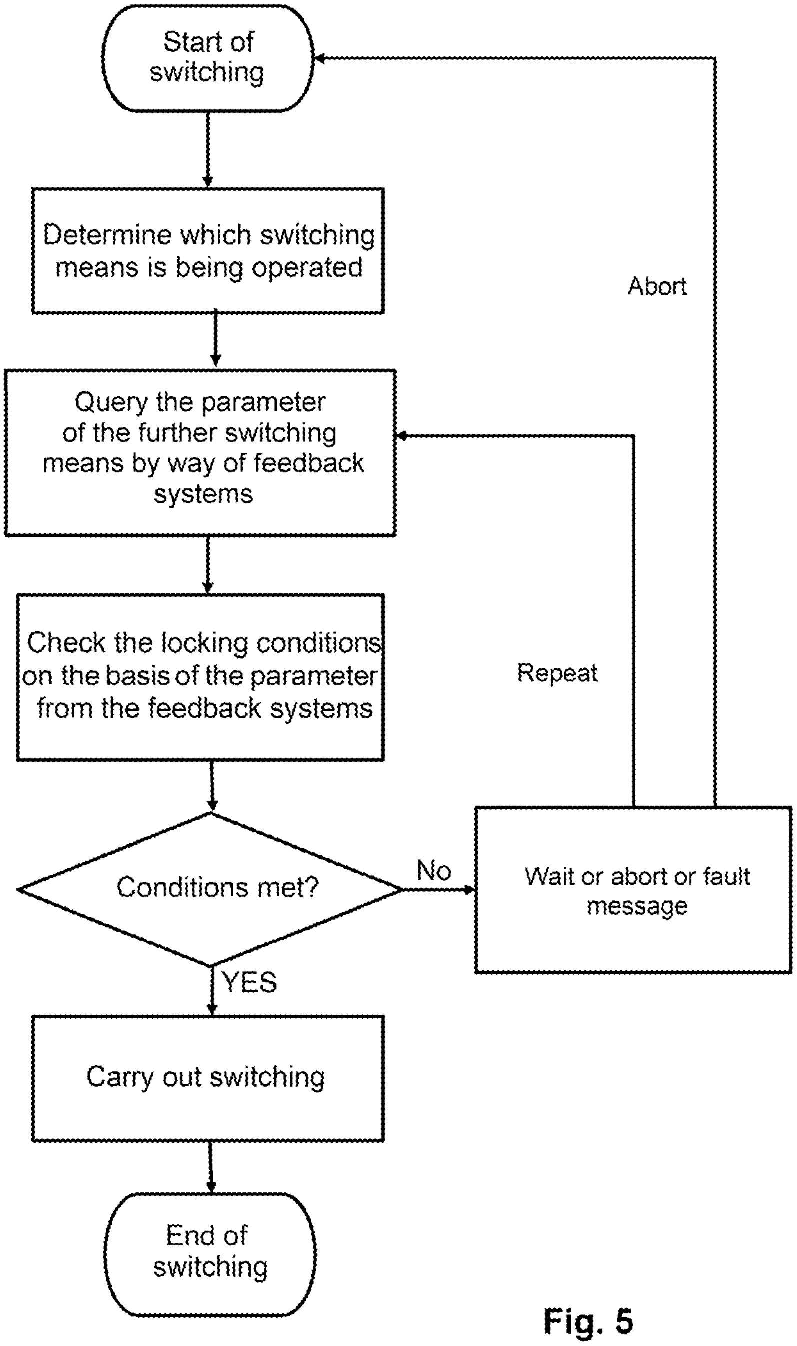
FIG. 5 shows an exemplary method sequence for carrying out a switchover of a switching means in equipment by means of the drive system according to the invention.

FIG. 5 shows an exemplary method sequence according to the invention. Here, the control device 2 receives a switching signal for operating an on-load tap-changer which preferably has a first switching means 17 and a second switching means 18, that is to say a diverter switch and a selector. This switching signal can be generated, for example, by manual input during maintenance work. As an alternative, the switching signal can be provided by a device for voltage regulation if, for example, the voltage across equipment 20, that is to say the transformer, falls or rises. After the switching signal is received, it is first determined which of the switching means 17 or 18 or that both of the switching means 17 and/or 18 have to be operated. After the switching means 17 and 18 to be operated is selected, the control unit 10 queries at least one parameter. In the example from FIG. 1, the queried parameter is, for example, the location of the selector, that is to say of the second switching means 18, which location is determined by the associated second feedback system 7 of the second motor 13. In the control unit 10, at least one locking condition, which may or may not be met by the at least one parameter, is stored in the memory 5. If the locking condition is met in the check, the switchover of the first switching means 17 is performed, that is to say the diverter switch is operated. If the locking condition is not met in the check, operation of the first switching means 17 is not performed, that is to say no switchover is performed either. The control unit 10 can then wait until the parameter meets the locking condition and then carries out the switchover. As an alternative, the switchover can already be aborted before the start. Tripping of a fault signal is likewise possible. Proceeding from the example in FIG. 1, before the operation of a diverter switch (first switching means 17), a check would first be made in respect of which position (location) the selector (second switching means 18) is located in and/or whether it is presently moving, that is to say is presently being operated. On account of the locking conditions in this example, the diverter switch (first switching means 17) must not be operated if the selector (second switching means 17) is presently being operated or, for example, is in an unsuitable/impermissible position (location). The parameters required for checking the locking conditions are output by the second feedback system 7 of the second motor 13 of the selector (second switching means 18). Here, the second feedback system 7 is designed, for example, as a multi-turn rotary encoder which is directly or indirectly connected to the drive shaft 16 which is arranged between the second motor 13 and the selector (second switching means 18). The multi-turn rotary encoder then determines the parameters, such as the location of the selector (second switching means 18) on the basis of the position of the drive shaft 16.

Different parameters can be combined with different locking conditions, depending on the configuration of the drive system 3. For example, as shown in the embodiment in FIG. 2, the location (positions) of the selector and the change-over selector (second and third switching means 18 and 19) are checked before the diverter switch (first switching means 17) is operated. As an alternative, the locking condition, that is to say the parameters of the diverter switch (first switching means 17) and the change-over selector (third switching means 19) are checked, before the selector (second switching means 18) is operated. Here too, the parameters are queried via the respective feedback systems 6 and 8 which are designed as multi-turn rotary encoders.

The parameters to be queried can be determined in any desired manner or can be of any desired type. The parameters can originate from feedback systems 6, 7 and 8 on the respective motors 12, 13 and 14 of the respective switching means 17, 18 and 19, from simple safety switches for the equipment 20 or even from customer-specific release buttons.

The locking conditions define which states have to be satisfied in order that a switchover is not "locked", that is to say blocked. These conditions are linked to parameters which are formed or defined by positions or locations of switching means 17, 18 and 19, the current statuses and movement states.

The locking conditions can use one or more parameters of one or any desired number of feedback systems 6, 7 and 8.

The parameters can be, for example, the movement states of switching means, location or position of switching means, the location range or position range of switching means, temperatures of equipment, customer-specific switching signals, safety devices and the like.

The switching means can be diverter switches, selectors, reversing change-over selectors and double reversing change-over selectors. These can be of single-phase or polyphase configuration.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SYMBOLS

2 Control device
3 Drive system
5 Memory
6 First feedback system
7 Second feedback system
8 Third feedback system
10 Control unit
11 Power section

12 First motor
13 Second motor
14 Third motor
16 Drive shaft
17 First switching means
18 Second switching means
19 Third switching means
20 Equipment
21 Bus
30 First switching means group
40 Second switching means group
50 Third switching means group

The invention claimed is:

1. A method of operating a tap-changer of a transformer for carrying out a switchover of a first switch or at least one second switch, the tap-changer comprising the first switch and the at least one second switch, the method comprising:
- receiving, by a controller, a switching signal;
- selecting, by the controller, the first switch or the at least one second switch for switchover on the basis of the switching signal;
- querying, by the controller, at least one parameter of the first switch or the at least one second switch;
- checking a locking condition on the basis of the at least one queried parameter for the first switch or a locking condition for the at least one second switch; and
- carrying out the switchover by the selected first switch or the at least one second switch based upon the corresponding locking condition being met,
- wherein the first switch is a diverter switch and the at least one second switch comprises a selector.

2. The method as claimed in claim 1, the method comprising: determining the at least one parameter of the first switch by a first feedback system; and determining the at least one parameter of the at least one second switch by a respective feedback system which is associated with the at least one second switch.

3. The method as claimed in claim 2, wherein the parameters for the switchover of one of the first switch or the at least one second switch, which are ascertained by the respective feedback system, are a position or location of the first switch or the at least one second switch.

4. The method as claimed in claim 2, wherein the parameters for the switchover of one of the first switch or the at least one second switch, which are ascertained by the respective feedback system, are a movement state of the first switch or the at least one second switch.

5. The method as claimed in claim 1, the method comprising evaluating and combining, by the controller, the queried parameters of the first switch or the at least one second switch so that the first switch, or the first switch and the at least one second switch, are actuated.

6. The method as claimed in claim 1, wherein, for carrying out the switchover, a power section, which is associated with the equipment, is actuated by the controller for operating the selected first switch or the selected at least one second switch and the power section operates a first motor, which is connected to the first switch via a drive shaft, and a respective second motor, which is connected to the at least one second switch via a respective drive shaft, depending on the switchover being carried out.

7. The method as claimed in claim 6, wherein the respective feedback system is each directly or indirectly associated with the respective drive shaft of the first switch or the at least one second switch, respectively.

8. The method as claimed in claim 1, the method comprising actuating, by the controller, a power section associated with each of a plurality of items of the equipment, wherein the first switch of the plurality of items of the equipment are combined to form a first switch group and the at least one second switch are combined to form at least one second switch group.

9. A tap-changer, the tap changer comprising:

a first switch connected to a first motor via a drive shaft;

at least one second switch being connected to at least one respective second motor via a second drive shaft;

a respective feedback system, which is associated with each of the first motor and the at least one second motor, the respective feedback system being configured to ascertain at least one parameter of the respective one of the first switch or the at least one second switch; and a controller, which is connected in a communicating manner to a power section, configured to operate the first switch using the first motor and to operate the at least one second switch using the at least one second motor, and further configured to selectively operate one from the group of the first switch and the at least one second switch based upon a switching signal and upon the corresponding locking condition being met by the at least one determined parameter that is evaluated in the controller, wherein the first switch is a diverter switch and the at least one second switch comprises a selector.

10. The tap-changer as claimed in claim 9, wherein the at least one second switch comprises a second switch, which is connected to a second motor, and a third switch, which is connected to a third motor.

11. The tap-changer as claimed in claim 9, wherein the drive system is associated with a plurality of items of the equipment, a power section is associated with each of the items of equipment and the power sections are connected in a communicating manner to the controller, wherein the first switches for the plurality of items of the equipment are combined to form a first switch group and at least two second switches are combined to form at least one second switch group.

12. The tap-changer as claimed in claim 10, wherein the at least one second switch consists of a second switch and a third switch, wherein the switches of the second switch are combined to form a second switch group and the switches of the third switch are combined to form a third switch group.

13. The tap-changer as claimed in claim 9, wherein each of the second switches are respectively connected to the second motor via the drive shaft and the second switch are combined to form a second switch group.

14. The tap-changer as claimed in claim 9, wherein the controller and the power section each comprise a memory.

15. The method of claim 1, wherein the controller is configured to operate the diverter switch independent from operating the selector.

16. The method of claim 1, wherein the switchover of the diverter switch is mechanically independent from the switchover of selector.

* * * * *